(12) United States Patent
Nakajima

(10) Patent No.: US 9,372,647 B2
(45) Date of Patent: Jun. 21, 2016

(54) IMAGE FORMING APPARATUS CAPABLE OF PRINTING IMAGE DATA ASSOCIATED WITH PRINT RIGHT, METHOD OF CONTROLLING THE SAME, AND STORAGE MEDIUM

(71) Applicant: CANON KABUSHIKI KAISHA, Tokyo (JP)

(72) Inventor: Junko Nakajima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/970,658

(22) Filed: Aug. 20, 2013

(65) Prior Publication Data

US 2014/0055808 A1 Feb. 27, 2014

(30) Foreign Application Priority Data

Aug. 21, 2012 (JP) ................................. 2012-182540

(51) Int. Cl.
*G06F 3/12* (2006.01)
*G06F 21/60* (2013.01)

(52) U.S. Cl.
CPC ............ *G06F 3/1238* (2013.01); *G06F 3/1222* (2013.01); *G06F 3/1271* (2013.01); *G06F 3/1285* (2013.01); *G06F 21/608* (2013.01)

(58) Field of Classification Search
CPC .............. H04N 2201/3274; H04N 2201/3277; H04N 1/4406; H04N 1/444; G06K 15/1814; G06K 15/1886; G06K 15/4095; G06F 3/1238; G06F 3/1271; G06F 21/608; G06F 3/1285; G06F 3/1222

USPC ...................... 358/1.13–1.16; 658/1.13–1.16; 583/1.13–1.16

See application file for complete search history.

(56) References Cited

U.S. PATENT DOCUMENTS 7,861,282 B2 12/2010 Kakigi
8,237,939 B2 8/2012 Kamiya et al.
(Continued)

FOREIGN PATENT DOCUMENTS

JP 2005-343034 A 12/2005
JP 2007004683 A 1/2007
(Continued)

OTHER PUBLICATIONS

Office Action issued in Japanese Appln. No. 2012-182540 mailed Apr. 19, 2016. Machine English translation provided.

*Primary Examiner* — Kent Yip
(74) *Attorney, Agent, or Firm* — Rossi, Kimms & McDowell LLP

(57) ABSTRACT

An image forming apparatus capable of providing security for print right-associated image data. An image forming apparatus is capable of communicating with a management server that manages print rights. When printing image data stored in the storage section, a CPU determines whether a print right is associated with the image data. Whenever it is determined that a print right is associated with image data, the CPU makes an inquiry of the management server about print permission of the image data associated with the print right. A printer section prints an image represented by the image data when a response from the management server indicates that the image data associated with the print right is permitted to be printed.

18 Claims, 11 Drawing Sheets

(56) References Cited

U.S. PATENT DOCUMENTS

| | | | |
|---|---|---|---|
| 2003/0105963 A1* | 6/2003 | Slick et al. | 713/171 |
| 2006/0290963 A1* | 12/2006 | Sakuraba et al. | 358/1.13 |
| 2007/0177186 A1* | 8/2007 | Kishimoto | 358/1.14 |
| 2012/0148323 A1* | 6/2012 | Shimada et al. | 400/76 |

FOREIGN PATENT DOCUMENTS

| | | |
|---|---|---|
| JP | 2007095034 A | 4/2007 |
| JP | 2007188477 A | 7/2007 |
| JP | 2008040675 A | 2/2008 |
| JP | 2010-097350 A | 4/2010 |

* cited by examiner

| RECEPTION NO. 401 | JOB TYPE 402 | USER NAME 403 | DOCUMENT NAME 404 | IMAGE DATA PATH 405 | PRINT SETTINGS 406 |
|---|---|---|---|---|---|
| 0010 | PRINT | UserA | AAA_ADDRESS BOOK | /Reprint/20110613_0010 | STAPLING (AT TWO OF TOP) |
| 002b | STORAGE | UserB | MINUTES | — | — |
| 020f | PRINT | UserC | BBB_ORDERS | /Reprint/20110613_020f | DOUBLE-SIDED/ STAPLING (TOP LEFT) |
| 0293 | COPY | Guest | — | /Reprint/20110613_0293 | MONOCHROME/4in1/ PUNCHING (LEFT) |

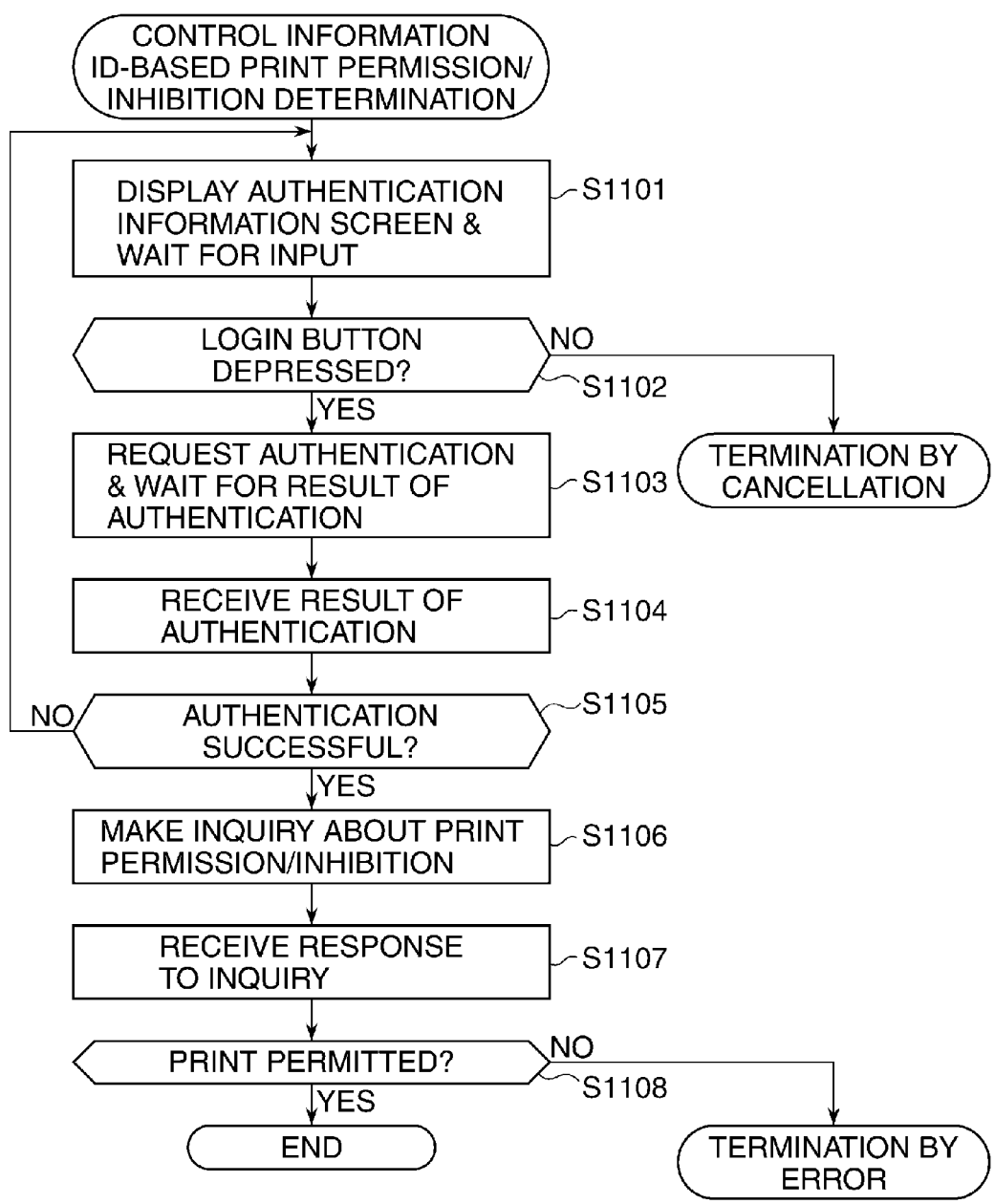

IMAGE FORMING APPARATUS CAPABLE OF PRINTING IMAGE DATA ASSOCIATED WITH PRINT RIGHT, METHOD OF CONTROLLING THE SAME, AND STORAGE MEDIUM

BACKGROUND OF THE INVENTION

1. Field of the Invention

The present invention relates to an image forming apparatus capable of printing image data associated with a print right, a method of controlling the same, and a storage medium.

2. Description of the Related Art

In a recent image forming apparatus, in addition to image data read from a scanner device and print data received from a personal computer, it is possible to print out document data which is stored in a memory medium or on a network file server and is input to the image forming apparatus as print data.

Further, according to improved performance and increased multifunctionality, the user can perform printout with a wide variety of formats, and on the other hand, settings therefor have been made complicated.

When the same data once printed is to be reprinted with the same settings, it is necessary to perform data input and configuration of complicated print settings again, which makes the process troublesome and there is a possibility that the resulting output turns out to be different from the first printout.

In view of this, there has been proposed a reprinting function for accumulating rendered image data generated from input data in a storage device of an image forming apparatus, storing the rendered image data together with the print settings in association with print history information, and thereby enabling the stored data to be used when executing reprinting.

The reprinting function enables the user to perform reprinting with ease, and reduce output time because the rendered image data is made use of.

Further, the input data which can be set as an object to be reprinted includes document data stored in a memory medium, and document data stored on a network file server, and these kinds of document data include access control information-associated documents.

However, the access control information-associated documents are documents that permit various kinds of access control by being associated with access control information managed by an access control management server, which includes information on users who are permitted to view or print documents and information on time periods over which the users are permitted to view or print the documents.

Further, by changing the access control information in the access control management server, it is possible to change and update the access control settings without modifying the access control information-associated documents with which the access control information is associated.

When printing such an access control information-associated document, it is necessary to perform authentication of a user and make an inquiry of the access control management server about whether the authenticated user is permitted to print the document. When the authentication of the user has failed or it is determined that the authenticated user is not permitted to print the document, it is necessary to prohibit the printout by the user.

In a case where the authenticated user is permitted to print the document, when executing reprinting using the reprinting function, the user can print the document without user authentication and making an inquiry of the access control management server, which brings about a problem concerning the security of information (protection of information).

To achieve both the security of information and the convenience of reprinting, there has been proposed a print system in which a user is requested to designate a secrecy degree of image data when executing printing, and it is judged according to the secrecy degree whether or not the image data is to be stored in a storage device or to be abandoned (see e.g. Japanese Patent Laid-Open Publication No. 2010-97350).

Further, there has also been proposed a method in which reprinting is permitted only when a user who has issued a print job and a user who requested reprinting match (see e.g. Japanese Patent Laid-Open Publication No. 2005-343034).

However, according to the technique disclosed in Japanese Patent Laid-Open Publication No. 2010-97350, in a case where the user designates a high secrecy degree for a document, it is possible to protect the security of the document, but a malicious user is capable of intentionally designating a low secrecy degree, which makes it impossible to positively protect the security of the document. Also, even a user who is not malicious can sometimes designate a low secrecy level by mistake.

Further, according to the technique disclosed in Japanese Patent Laid-Open Publication No. 2005-343034, a user who input a password at the time of printing is permitted to perform reprinting without inputting the password again, and other users who do not know the password cannot perform reprinting, and hence it is possible to protect the security of the document.

However, it is impossible for even a use who can input a correct password to perform reprinting unless the user is a user who issued the job, and hence it is impossible for a plurality of users to perform reprinting of a document provided with such security settings as mentioned above, in a shared manner.

Further, even for either of the conventional techniques of Japanese Patent Laid-Open Publication No. 2010-97350 and Japanese Patent Laid-Open Publication No. 2005-343034, it is impossible to determine, when the access control settings in the access control management server which are associated with documents are changed, whether reprinting is permitted in a manner following up the changes in the access control settings.

Thus, the conventional techniques has a problem that it is impossible to provide sufficient security protection for image data associated with use rights, such as documents provided with security settings, when the documents are used again.

SUMMARY OF THE INVENTION

The present invention provides an image forming apparatus capable of providing security for print right-associated image data, a method of controlling the same, and a storage medium.

In a first aspect of the present invention, there is provided an image forming apparatus capable of communicating with a management server that manages print rights, comprising an input unit configured to input data, a communication unit configured to, if a print right is associated with the input data, make an inquiry of the management server about print permission of the input data and to receive a response to the inquiry from the management server, a printing unit configured to print the input data based on the response received by said communication unit, a storage unit configured to store, if said printing unit prints the input data with which a print right is not associated, print history information and raster image data converted from the input data, and to store, if said printing unit prints the input data with which a print right is associated, print history information and the input data itself, and a control unit configured to control said printing unit to re-print the raster image or the input data, based on the print history information stored in said storage unit.

In a second aspect of the present invention, there is provided a method of controlling an image forming apparatus capable of communicating with a management server that manages print rights, comprising inputting data, making an inquiry of the management server about print permission of the input data if a print right is associated with the input data, receiving a response to the inquiry from the management server, printing by a printing unit, the input data based on the response received from the management server, storing print history information and raster image data converted from the input data if the printing unit prints the input data with which a print right is not associated, storing print history information and the input data itself if the printing unit prints the input data with which a print right is associated, and controlling the printing unit to re-print the raster image data or the input data, based on the stored print history information.

In a third aspect of the present invention, there is provided a non-transitory computer-readable storage medium storing a control program for causing a computer to execute a method of controlling an image forming apparatus capable of communicating with a management server that manages print rights, wherein the method comprises inputting data, making an inquiry of the management server about print permission of the input data if a print right is associated with the input data, receiving a response to the inquiry from the management server, printing by a printing unit, the input data based on the response received from the management server, storing print history information and raster image data converted from the input data if the printing unit prints the input data with which a print right is not associated, storing print history information and the input data itself if the printing unit prints the input data with which a print right is associated, and controlling the printing unit to re-print the raster image data or the input data, based on the stored print history information.

According to the present invention, it is possible to provide an image forming apparatus capable of providing security for print right-associated image data, a method of controlling the same, and a storage medium.

Further features of the present invention will become apparent from the following description of exemplary embodiments with reference to the attached drawings.

BRIEF DESCRIPTION OF THE DRAWINGS

FIG. 4 is a history information management table stored in an HDD appearing in FIG. 2.

FIG. 11 is a flowchart of a control information ID-based print permission/inhibition determination process, which is executed in a step in the reprint process shown in FIG. 10.

DESCRIPTION OF THE EMBODIMENTS

The present invention will now be described in detail below with reference to the accompanying drawings showing embodiments thereof.

Figure 1:
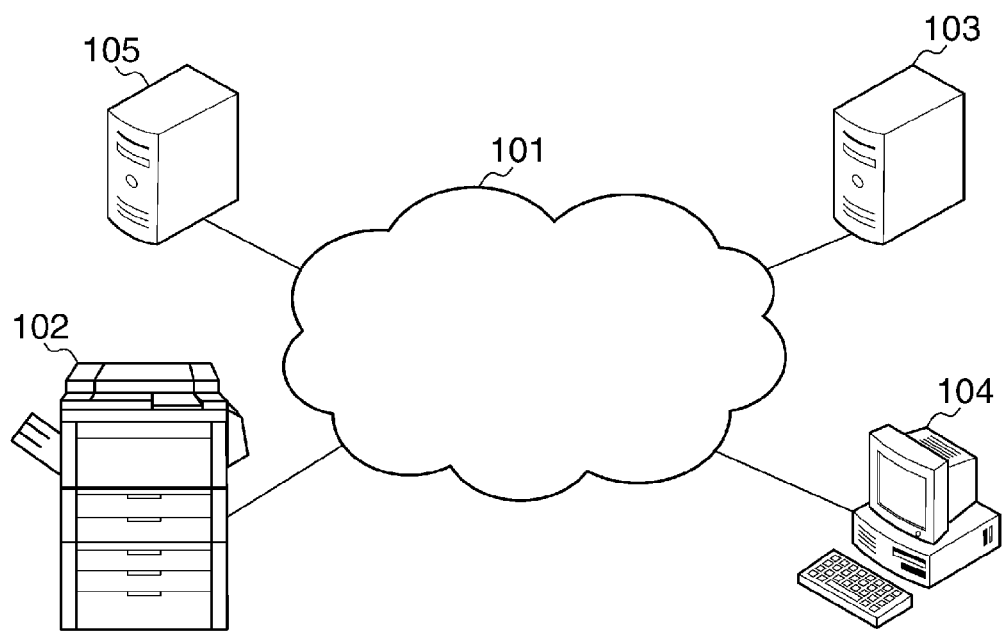
FIG. 1 is a block diagram of a system including an image forming apparatus according to a first embodiment of the present invention.

FIG. 1 is a block diagram of a system 100 including an image forming apparatus according to a first embodiment of the present invention.

In FIG. 1, the system 100 comprises the image forming apparatus, denoted by reference numeral 102, a file server 103, a client computer 104, an access control management server 105, and a network 101 connecting between them such that they can communicate with each other.

In the system 100, a document, for example, is read by a scanner section of the image forming apparatus 102 to generate image data, the image data is converted to document data, and then the document data is transmitted to the client computer 104 via the network 101. Note that in the present embodiment, document data is defined as a type of image data.

The image forming apparatus 102 can associate image data to be transmitted thereby with access control information managed by the access control management server 105.

Further, the client computer 104 is capable of storing document data generated by the image forming apparatus 102 or by a software application operating on the client computer 104 in a state associated with the access control information.

Further, the image forming apparatus 102 is capable of printing out document data stored in the client computer 104 and the file server 103. When document data is associated with the access control information, the image forming apparatus 102 makes an inquiry of the access control management server 105 about whether or not the document data is permitted to be printed, and then performs printing of the document data only when the document data is permitted to be printed.

More specifically, the access control management server 105 manages use rights which authorize the use of documents. The term "use rights" are rights for viewing, editing, printing, etc., granted on a user-by-user basis or on a group-by-group basis, and which can be changed as required. Further, the access control management server 105 is capable of adding watermarks, setting validity time periods of image data, and performing security management of expiration of validity, auditing, and so forth.

As described above, the access control management server 105 is a management server that manages use rights (including print rights) of use right-associated image data, including print permission/inhibition of image data, which can be changed.

The arrangement of the system described above is a general one, and there may be provided a plurality of computers and a plurality of image forming apparatuses which are used by general users. Further, the image forming apparatus may be a scanner or like device which is connected as a discrete device to the network 101.

Figure 2:
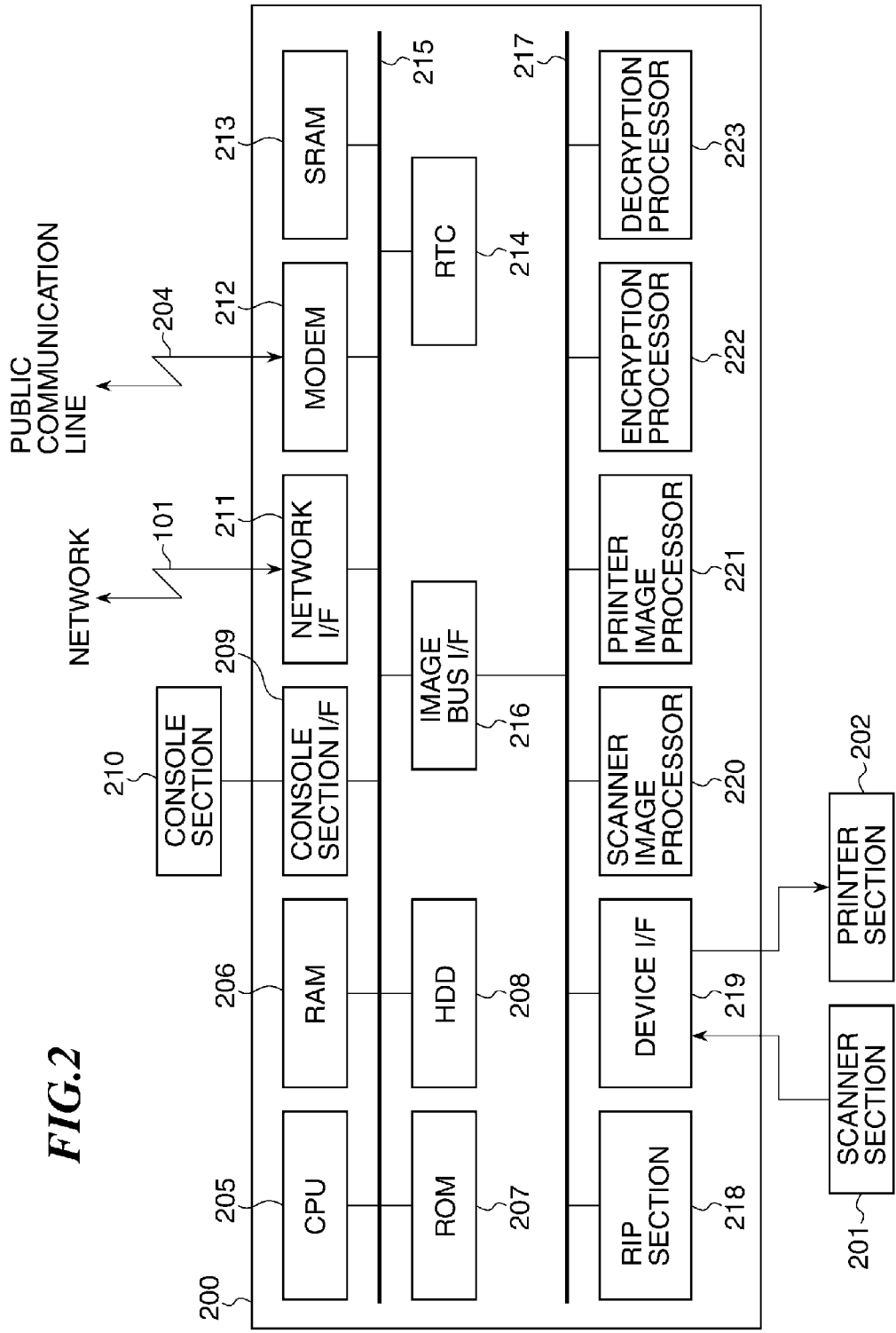
FIG. 2 is a schematic block diagram of the image forming apparatus appearing in FIG. 1.

FIG. 2 is a schematic block diagram of the image forming apparatus 102 in FIG. 1.

Referring to FIG. 2, a controller unit 200 is connected to the scanner section designated by reference numeral 201, which is an image input device, a printer section 202, which is an image output device, the network 101, and a public communication line 204, thereby performing input and output of image information and device information.

The controller unit 200 comprises components described hereafter. A CPU 205 controls the whole image forming apparatus 102. A RAM 206 is a system work memory used by the CPU 205 for operation, and also serves as an image memory for temporarily storing image data.

A ROM 207 is a boot ROM that stores a boot program of the system. An HDD (hard disk drive) 208 stores system software, application software, and image data, and corresponds to a storage unit.

A console section interface 209 provides interface with a console section 210 including a touch panel, and outputs image data to be displayed on the console section 210. Further, the console section interface 209 transmits information input by a user from the console section 210 to the CPU 205.

A network interface 211 is connected to the network 101, for performing input and output of information. A MODEM 212 is connected to the public communication line 204, for performing input and output of information.

A SRAM 213 is a volatile storage device that is operable at high speed, and in the present embodiment, the SRAM 213 is provided with a backup power source, not shown, and hence serves as a nonvolatile storage device. An RTC 214 is a real time clock that continues to count the present time even when the controller unit 200 is not powered on. The devices described above are connected to a system bus 215.

An image bus interface 216 is a bus bridge that connects between the system bus 215 and an image bus 217 that transfers image data at high speed, and converts a data structure.

The image bus 217 is implemented by a PCI bus or an IEEE 1394 bus. Connected to the image bus 217 are devices described hereafter.

A RIP section 218 is a raster image processor that converts PDL code to a raster image data. The RIP section 218 corresponds to a conversion unit that converts image data to raster image data for use in printing.

A device interface 219 connects between the scanner section 201 and the printer section 202 and the controller unit 200, for synchronous/asynchronous conversion of image data.

A scanner image processor 220 corrects, manipulates, edits input image data. A printer image processor 221 performs correction, resolution conversion, etc. of image data for printout. An encryption processor 222 performs encryption of input data including image data. A decryption processor 223 performs decryption of encrypted data.

Figure 3:
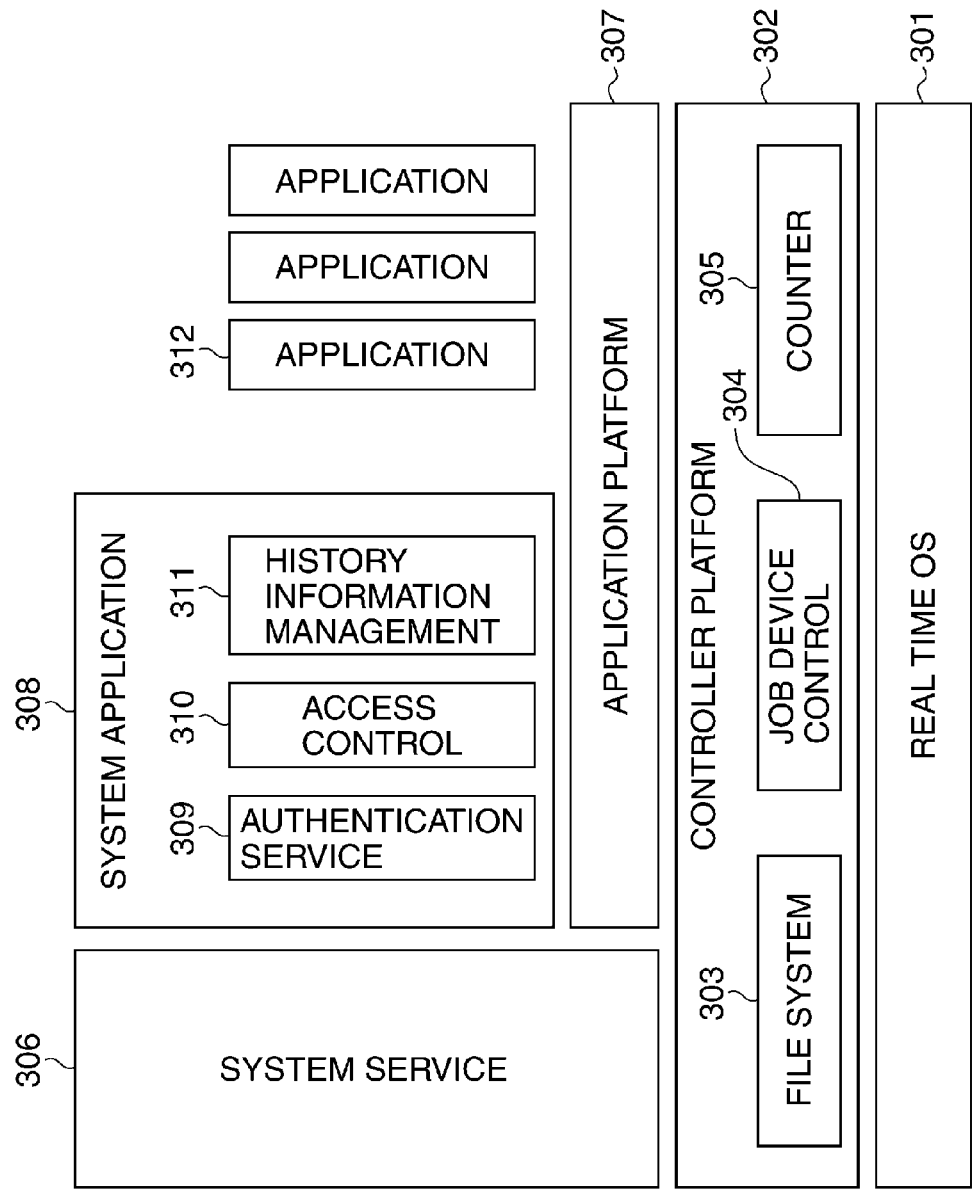
FIG. 3 is a diagram showing the software configuration of the image forming apparatus.

FIG. 3 is a diagram showing the software configuration of the image forming apparatus 102 appearing in FIG. 1.

Software modules appearing in FIG. 3 are mounted on the controller unit 200 of the image forming apparatus 102. Further, software modules incorporated in the image forming apparatus 102 and processed by the controller unit 200 are mounted as so-called firmware, and are executed by the CPU 205.

A real time OS 301 is a real time operating system, and provides resource management services and platform optimized for integrated system control, for software modules operating on the real time OS 301.

The resource management services and platform provided by the real time OS 301 include multitask management that manages a plurality of execution contexts by the CPU 205 to thereby enable a plurality of processes to operate substantially in parallel with each other, and task communication that realizes synchronization between tasks and data exchange.

Further, the resource management services and platform also include memory management, interrupt management, various drivers, local interface, and a protocol stack on which are mounted various protocol processes for networks and communications.

A controller platform 302 is formed by a file system 303, a job device control 304, and a counter 305.

The file system 303 is a mechanism constructed in storage devices, such as the HDD 208 and the RAM 206, for storing data, and is used for spooling jobs handled by the controller unit 200 and storing various data.

The job device control 304 controls the hardware of the image forming apparatus 102, and controls jobs which use basic functions, such as print, scan, communication, image conversion, etc., which are mainly provided by the hardware of the image forming apparatus 102.

The counter 305 manages expiry times, on an application-by-application basis, and counter values of print and scan.

A system service 306 is a module for monitoring an operating status of the image forming apparatus 102, and downloading software and licenses from a software distribution server, not shown, via the network 101.

An application platform 307 is middleware for enabling the mechanisms of the real time OS 301 and the controller platform 302 to be used by a system application 308, referred to hereinafter, and any of applications 312 which can be added.

The system application 308 comprises an authentication service 309, access control 310, and history information management 311.

The authentication service 309 requests the file server 103 or the access control management server 105 to perform authentication, using authentication information received from input by a user, and when the authentication is successful, acquires a user ID for identifying the user.

The access control 310 is a security module that permits or inhibits access to a job or any of various resources, based on user rights and security settings set for data.

The access control 310 makes an inquiry, when performing printing or previewing of an access control information-associated document, of the access control management server 105 about printing or viewing rights of the authenticated user.

The history information management 311 is a module for managing basic job information including types of executed jobs and document names. The history information management 311 stores history information management table, referred to hereinafter, in the HDD 208.

The applications 312 are modules which are each capable of displaying a menu on the console section 210 and receiving input by the user therefrom, and provide various functions realized by the image forming apparatus 102.

FIG. 4 is a diagram of the history information management table, denoted by reference numeral 400, which is stored in the HDD 208 appearing in FIG. 2.

Referring to FIG. 4, the history information management table 400 comprises a reception number 401, a job type 402, a user name 403, a document name 404, a image data path 405, and print settings 406.

The reception number 401 a number for identifying one record. The job type 402 indicates a type of each job, and in FIG. 2, examples of jobs for print, storage, and copy are shown.

The user name 403 indicates a user who caused an associated job to be executed. The document name 404 is the name of a file as an object to be subjected to processing indicated by the job type 402. The image data path 405 indicates a location where the file is stored. The print settings 406 indicate various settings according to which printing or copying was executed. Thus, for each image data item stored in the HDD 208, information on settings used for printing the image data item is stored in the HDD 208 in association with the image data item.

Figure 5:
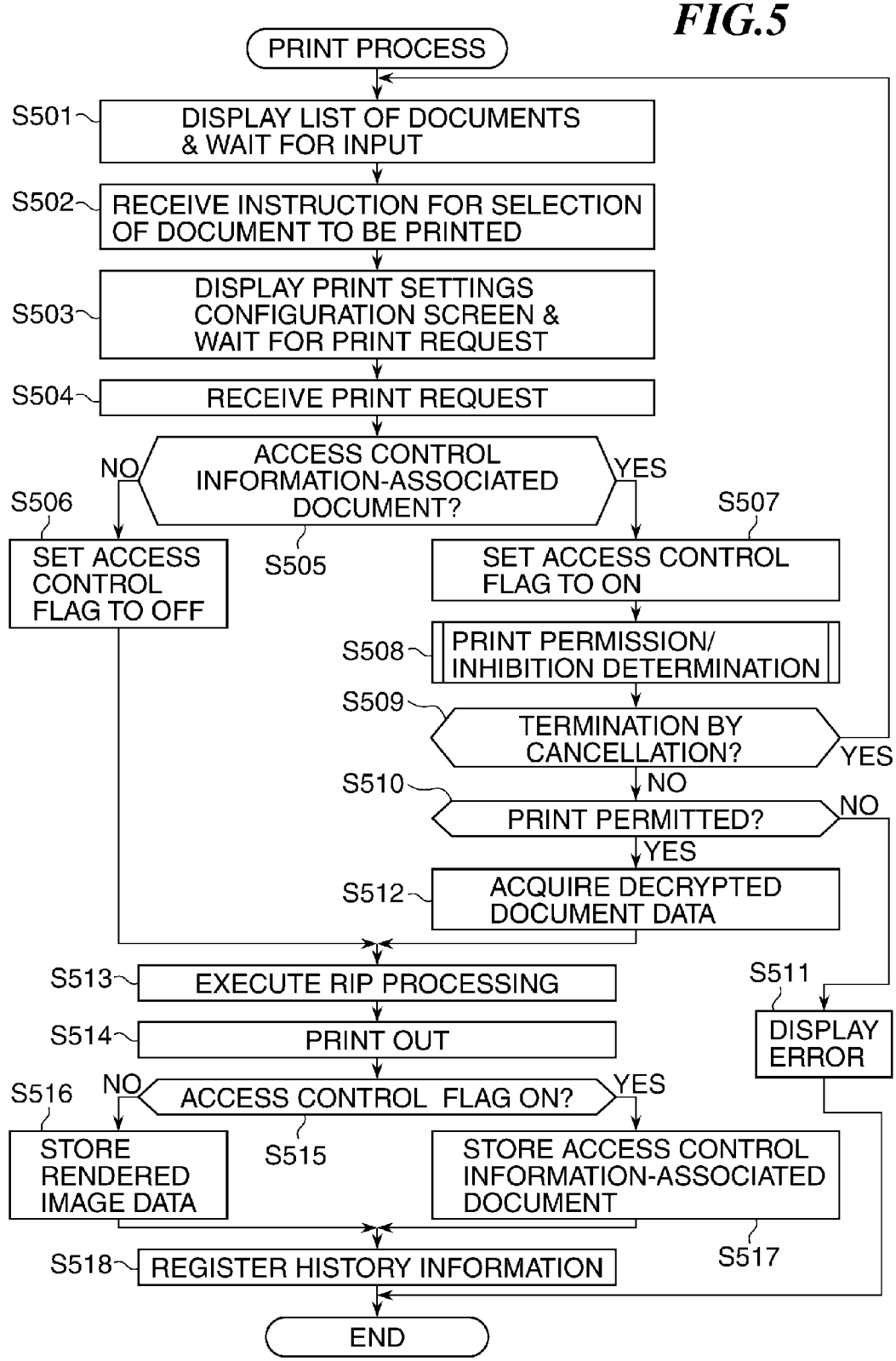
FIG. 5 is a flowchart of a print process executed by a CPU appearing in FIG. 2.

FIG. 5 is a flowchart of a print process executed by the CPU 205 appearing in FIG. 2.

Referring to FIG. 5, when the print process is executed, the CPU 205 displays a list of documents on the console section 210 and waits for input by the user (step S501). The list of documents displayed here includes documents stored in the file server 103 connected via the network 101, and documents stored in a removable medium, such as a USB memory, connected via the device interface 219.

Next, when an instruction for selecting a document to be printed is received from the user (step S502), the console section 210 sends information on the selected document to the CPU 205. Then, the CPU 205 displays a print settings configuration screen on the console section 210, and waits for a print request (step S503).

When the print request is received from the user (step S504), the console section 210 notifies the received request to the CPU 205. The CPU 205 read document data to be printed from the document information received in the step S502, makes an inquiry of the access control 310 about whether the document is an access control information-associated document.

The CPU 205 determines from the response to the inquiry from the access control 301 whether the document to be printed is an access control information-associated document (step S505).

If it is determined in the step S505 that the document to be printed is not an access control information-associated document (NO to the step S505), the CPU 205 sets an access control flag stored in the RAM 206 to OFF (step S506), and then proceeds to a step S513.

On the other hand, if it is determined in the step S505 that the document to be printed is an access control information-associated document (YES to the step S505), the CPU 205 sets the access control flag stored in the RAM 206 to ON (step S507).

Next, the CPU 205 executes a print permission/inhibition determination process for determining whether the document to be printed is permitted to be printed (step S508).

Then, it is determined whether the result of the print permission/inhibition determination process indicates termination by cancellation (step S509). If it is determined in the step S509 that the result of the print permission/inhibition determination process indicates termination by cancellation (YES to the step S509), the CPU 205 returns to the step S501.

On the other hand, if it is determined in the step S509 that the result of the print permission/inhibition determination process does not indicate termination by cancellation (NO to the step S509), it is determined whether or not the result of the print permission/inhibition determination process indicates that the document is permitted to be printed (step S510).

If it is determined in the step S510 that the result of the print permission/inhibition determination process does not indicate that the document is permitted to be printed (NO to the step S510), the CPU 205 causes an error message to be displayed on the console section 210 (step S511), followed by terminating the present process.

On the other hand, If it is determined in the step S510 that the result of the print permission/inhibition determination process indicates that the document is permitted to be printed (YES to the step S510), the CPU 205 acquires decrypted document data (step S512).

Then, the CPU 205 requests the RIP section 218 to execute RIP processing (step S513) to thereby generate rendered image data. The CPU 205 requests the printer section 202 to perform printout by sending the image data generated in the step S513 thereto via the device interface 219, whereby the printer section 202 executes printing (step S514). This step S514 corresponds to the operation of a printing unit configured to print input data based on the response received by a communication unit.

When the printout is terminated, the CPU 205 checks the access control flag stored in the RAM 206 to determine whether or not the access control flag is ON (step S515).

If it is determined in the step S515 that the access control flag is not ON (NO to the step S515), the rendered image data generated in the step S513 is stored in the HDD 208 (step S516). Then, the CPU 205 requests the history information management 311 to store history information (history record) in the history information management table 400, thereby executing history information registration (step S518), followed by terminating the present process.

On the other hand, if it is determined in the step S515 that the access control flag is ON (YES to the step S515), the CPU 205 stores the access control information-associated document read in the step S505 in the HDD 208 (step S517), and then proceeds to the step S518.

Figure 6:
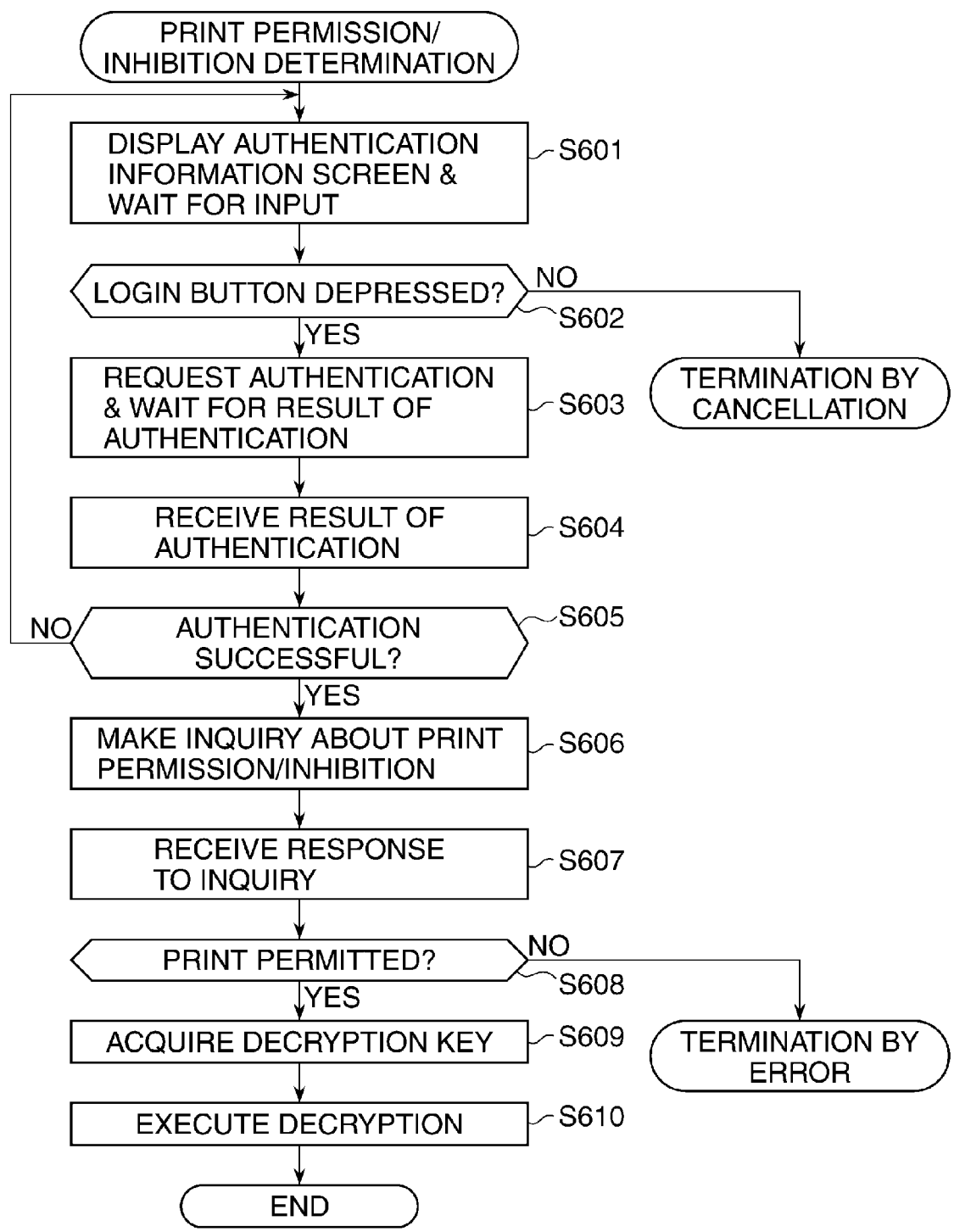
FIG. 6 is a flowchart of a print permission/inhibition determination process executed in a step in the print process shown in FIG. 5.

FIG. 6 is a flowchart of the print permission/inhibition determination process executed in the step S508 in FIG. 5.

Figure 7:
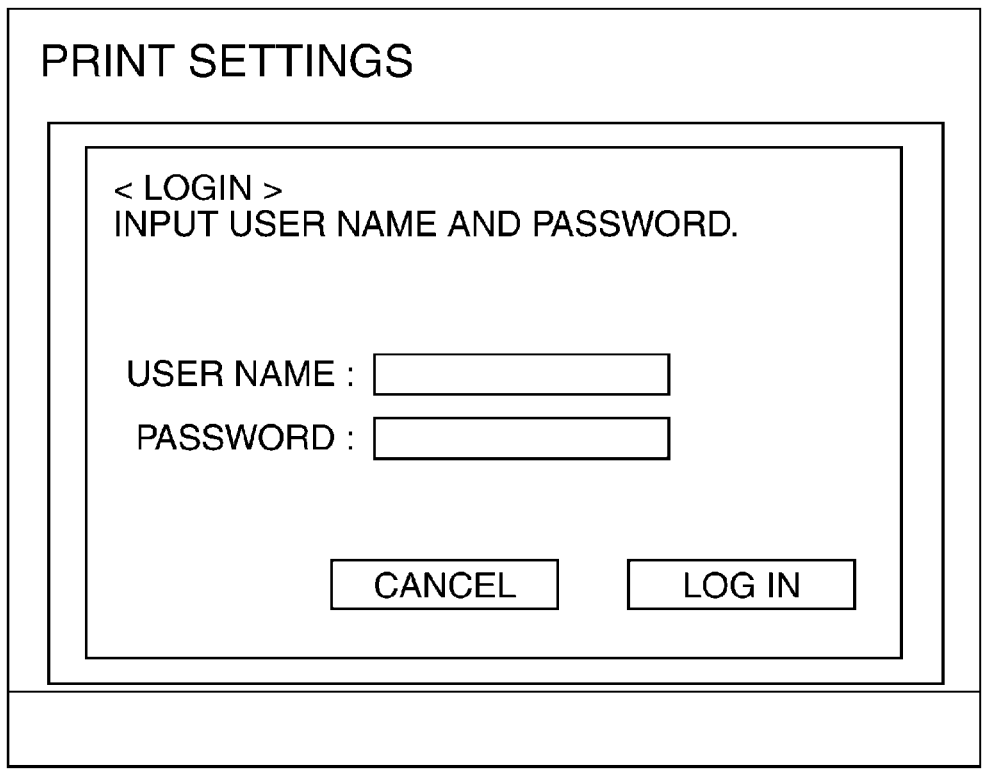
FIG. 7 is a view of an authentication information input screen displayed in a step of the print permission/inhibition determination process shown in FIG. 6.

Referring to FIG. 6, the CPU 205 displays an authentication information input screen on the console section 210, and waits for input by the user (step S601). FIG. 7 is a view of the authentication information input screen displayed in the step S601. As shown in FIG. 7, the authentication information input screen is a general screen to which a user name and a password are input, and is provided with a login button and a cancel button.

Next, it is determined whether or not an input from the user has been made by depression of the login button (step S602). If it is determined in the step S602 that the input from the user has been made not by depression of the login button but by depression of the cancel button (NO to the step S602), the present process is terminated by termination by cancellation.

On the other hand, if it is determined in the step S602 that the input from the user has been made by depression of the login button (YES to the step S602), the CPU 205 makes a request for authentication by sending authentication information formed by the user name and the password to the access control management server 105 and waits for reception of a result of the authentication therefrom (step S603).

The CPU 205 receives the result of the authentication (step S604), and determines whether or not the authentication is successful (step S605).

If it is determined in the step S605 that the authentication is not successful (NO to the step S605), the CPU 205 returns to the step S601. On the other hand, if it is determined in the step S605 that the authentication is successful (YES to the step S605), the CPU 205 makes an inquiry of the access control management server 105 about whether or not the access control information-associated document is permitted to be printed (step S606).

Then, the CPU 205 receives a response to the inquiry as to the print permission/inhibition of the access control information-associated document (step S607) and determines whether or not the response to the inquiry indicates that the document is permitted to be printed (step S608). The above steps S606 and S607 correspond to the operation of a communication unit configured to, if a print right is associated with the input data, make an inquiry of a management server about print permission of the input data and to receive a response to the inquiry from the management server.

If it is determined in the step S608 that the response to the inquiry indicates that the document is not permitted to be printed (NO to the step S608), the CPU 205 terminates the present process by termination by error.

On the other hand, if it is determined in the step S608 that the response to the inquiry indicates that document is permitted to be printed (YES to the step S608), the CPU 205 acquires from the access control management server 105 a decryption key for decrypting the access control information-associated document (step S609).

Then, the CPU 205 causes the decryption processor 223 to execute decryption processing using the decryption key acquired in the step S609 (step S610), followed by terminating the present process.

According to the print process described with reference to FIGS. 6 and 7, when printing image data stored in the HDD 208, it is determined whether or not the image data (document to be printed) is use right (print right)-associated image data (access control information-associated document) (step S505). Whenever it is determined that the image data is use right-associated image data, an inquiry is made of the management server about whether the use right-associated image data is permitted to be printed, and receives a response to the inquiry from the management server (steps S606 and S607). Next, in a case where the response received from the management server indicates that the use right-associated image data is permitted to be printed, an image represented by the image data is printed. This makes it possible to secure security of the use right-associated image data.

Figure 8:
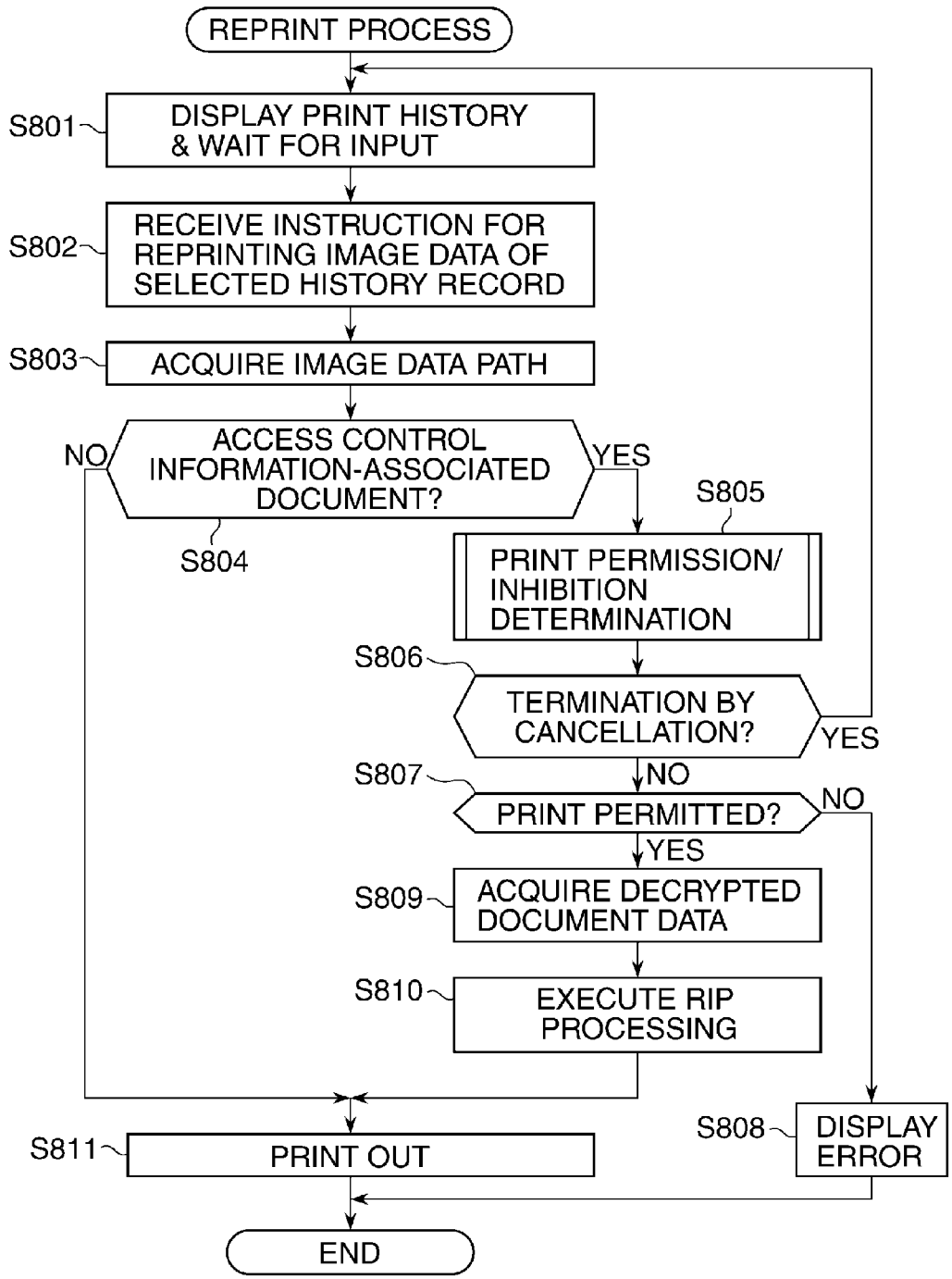
FIG. 8 is a flowchart of a reprint process executed by the CPU in FIG. 2.

FIG. 8 is a flowchart of a reprint process executed by the CPU 205 appearing in FIG. 2.

In FIG. 8, when the reprint process is started, the CPU 205 displays print history on the console section 210 and waits for input by the user (step S801). The print history displayed here is a list of history records of jobs of which the job type 402 is print, out of history records that can be acquired from the history information management 311.

When the CPU 205 receives an instruction given by the user for reprinting image data of a history record selected for reprinting (step S802), the console section 210 sends the selected history record and a reprint request to the CPU 205.

Further, the CPU 205 acquires an image data path of the received history record from the history information management table 400 (step S803). The CPU 205 makes an inquiry of the access control 310 about whether the image data identified by the image data path acquired in the step S803 is an access control information-associated document.

Then, the CPU 205 determines based on a response from the access control 310 whether or not the image data is an access control information-associated document (step S804). If it is determined in the step S804 that the image data is not an access control information-associated document (NO to the step S804), the CPU 205 proceeds to a step S811.

On the other hand, if it is determined in the step S804 that the image data is an access control information-associated document (YES to the step S804), the CPU 205 performs the print permission/inhibition determination process described hereinabove with reference to FIG. 6 (step S805).

Then, the CPU 205 determines whether or not the result of the print permission/inhibition determination process indicates termination by cancellation (step S806). If it is determined in the step S806 that the result of the print permission/inhibition determination process indicates termination by cancellation (YES to the step S806), the CPU 205 returns to the step S801.

On the other hand, if it is determined in the step S806 that the result of the print permission/inhibition determination process does not indicate termination by cancellation (NO to the step S806), the CPU 205 determines whether or not the result of the print permission/inhibition determination process indicates that the document is permitted to be printed (step S807).

If it is determined in the step S807 that the result of the print permission/inhibition determination process does not indicate that the document is permitted to be printed (NO to the step S807), the CPU 205 causes an error message to be displayed on the console section 210 (step S808), followed by terminating the present process.

On the other hand, if it is determined in the step S807 that the result of the print permission/inhibition determination process indicates that the document is permitted to be printed (YES to the step S807), the CPU 205 acquires decrypted document data (step S809).

Then, the CPU 205 requests the RIP section 218 to execute RIP processing (step S810) to thereby generate rendered image data. The CPU 205 requests the printer section 202 to perform printout by sending the image data generated in the step S810 thereto via the device interface 219 (step S811), followed by terminating the present process.

According to the process described above, by storing an access control information-associated document in the HDD 208 and uses the same when reprinting, it is possible to determine whether the document can be printed at the time of reprinting, whereby it is possible to protect security of the document without degrading the convenience of reprinting.

Next, a second embodiment of the present invention will be described. The second embodiment is identical to the first embodiment in respect of the network configuration (see FIG. 1), the general hardware configuration (see FIG. 2) and software configuration of the image forming apparatus (see FIG. 3), and the print permission/inhibition determination process (see FIG. 6), and hence description thereof is omitted.

Figure 9:
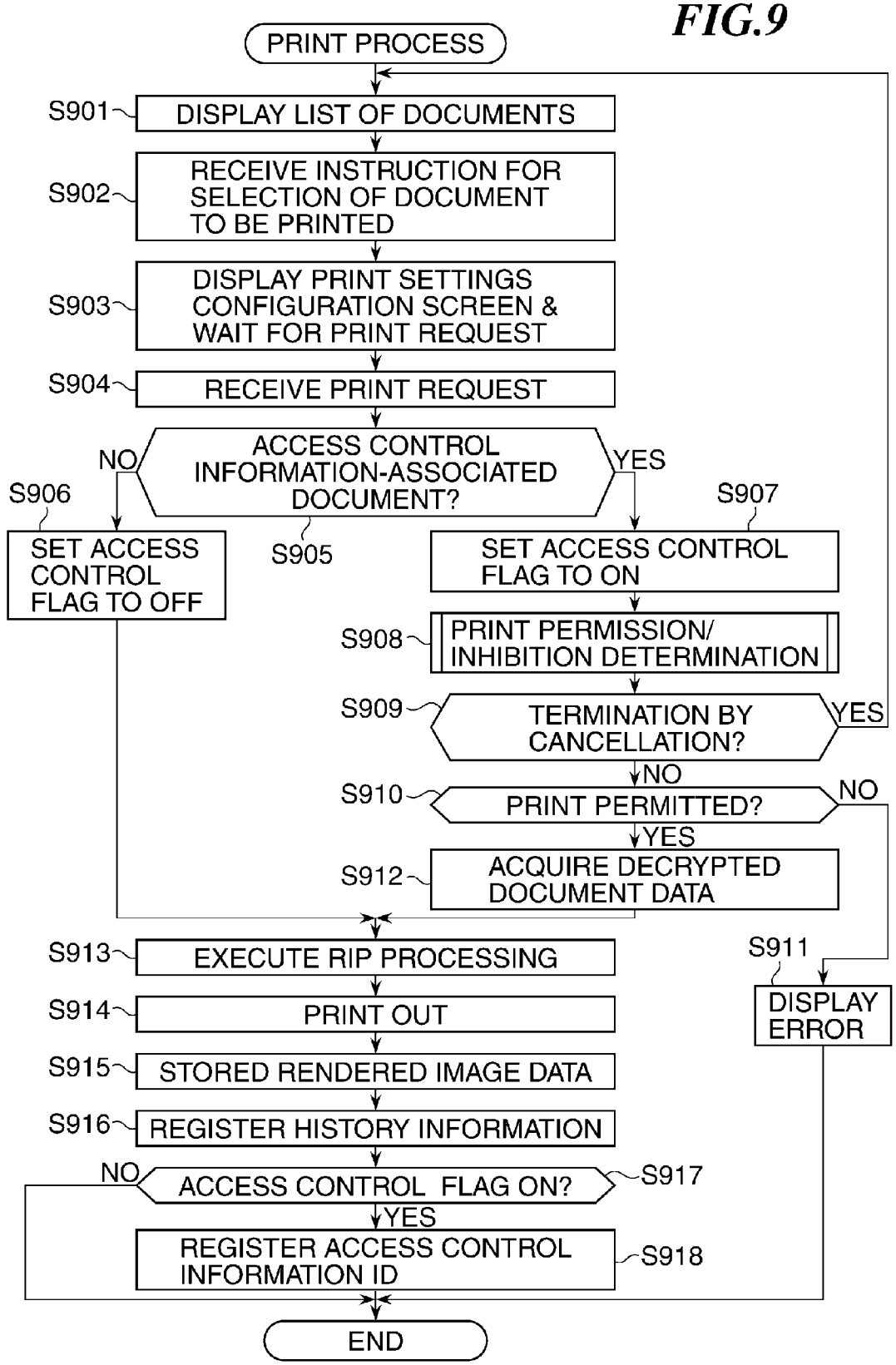
FIG. 9 is a flowchart of a print process executed by a CPU of an image forming apparatus according to a second embodiment of the present invention.

FIG. 9 is a flowchart of a print process executed by the CPU 205 of the image forming apparatus according to the second embodiment.

Referring to FIG. 9, when the print process is executed, the CPU 205 displays a list of documents on the console section 210 and waits for input by the user (step S901). The list of documents displayed here includes documents stored in the file server 103 connected via the network 101, and documents stored in a removable medium, such as a USB memory, connected via the device interface 219.

Next, when an instruction for selecting a document to be printed is received from the user (step S902), the console section 210 sends information on the selected document to the CPU 205. Then, the CPU 205 displays a print settings configuration screen on the console section 210, and waits for a print request (step S903).

When the print request is received from the user (step S904), the console section 210 notifies the received request to the CPU 205. The CPU 205 read document data to be printed from the document information received in the step S902, makes an inquiry of the access control 310 about whether the document is an access control information-associated document.

The CPU 205 determines from the response to the inquiry from the access control 301 whether the document to be printed is an access control information-associated document (step S905). If it is determined in the step S905 that the document to be printed is not an access control information-associated document (NO to the step S905), the CPU 205 sets an access control flag stored in the RAM 206 to OFF (step S906), and then proceeds to a step S913.

On the other hand, if it is determined in the step S905 that the document to be printed is an access control information-associated document (YES to the step S905), the CPU 205 sets the access control flag stored in the RAM 206 to ON (step S907).

Next, the CPU 205 executes the print permission/inhibition determination process described hereinabove with reference to FIG. 6 (step S908). Then, it is determined whether the result of the print permission/inhibition determination process indicates termination by cancellation (step S909). If it is determined in the step S909 that the result of the print permission/inhibition determination process indicates termination by cancellation (YES to the step S909), the CPU 205 returns to the step S901.

On the other hand, if it is determined in the step S909 that the result of the print permission/inhibition determination process does not indicate termination by cancellation (NO to the step S909), it is determined whether or not the result of the print permission/inhibition determination process indicates that the document is permitted to be printed (step S910).

If it is determined in the step S910 that the result of the print permission/inhibition determination process does not indicate that the document is permitted to be printed (NO to the step S910), the CPU 205 causes an error message to be displayed on the console section 210 (step S911), followed by terminating the present process.

On the other hand, if it is determined in the step S910 that the result of the print permission/inhibition determination process indicates that the document is permitted to be printed (YES to the step S910), the CPU 205 acquires decrypted document data (step S912).

Then, the CPU 205 requests the RIP section 218 to execute RIP processing (step S913) to thereby generate rendered image data. The CPU 205 requests the printer section 202 to perform printout by sending the image data generated in the step S913 thereto via the device interface 219 (step S914).

When the printout is terminated, the CPU 205 stores the generated rendered image data in the HDD 208 (step S915). Then, the CPU 205 requests the history information management 311 to store history information (history record) in the history information management table 400, thereby executing history information registration (step S916).

Then, the CPU 205 checks the access control flag stored in the RAM 206 to determine whether or not the access control flag is ON (step S917).

If it is determined in the step S917 that the access control flag is not ON (NO to the step S917), the CPU 205 immediately terminates the present process.

On the other hand, if it is determined in the step S917 that the access control flag is ON (YES to the step S917), the CPU 205 requests the history information management 311 to store access control information ID in the history information management table 400, thereby executing registration of the access control information ID (step S918), followed by terminating the present process. The access control information ID is an identifier for enabling the history information management 311 to identify access control information.

As described above, in the print process shown in FIG. 9, in a case where raster image data converted from print right-associated image data is stored in the HDD 208 for use in reprinting, the following process is executed: Identification information (access control information ID) indicating that the raster image data is print right-associated image data is stored in the HDD 208. By referring to the identification information, it is determined in a step S1004 in a reprint process described hereafter with reference to FIG. 10 whether or not the raster image data is print right-associated image data.

Figure 10:
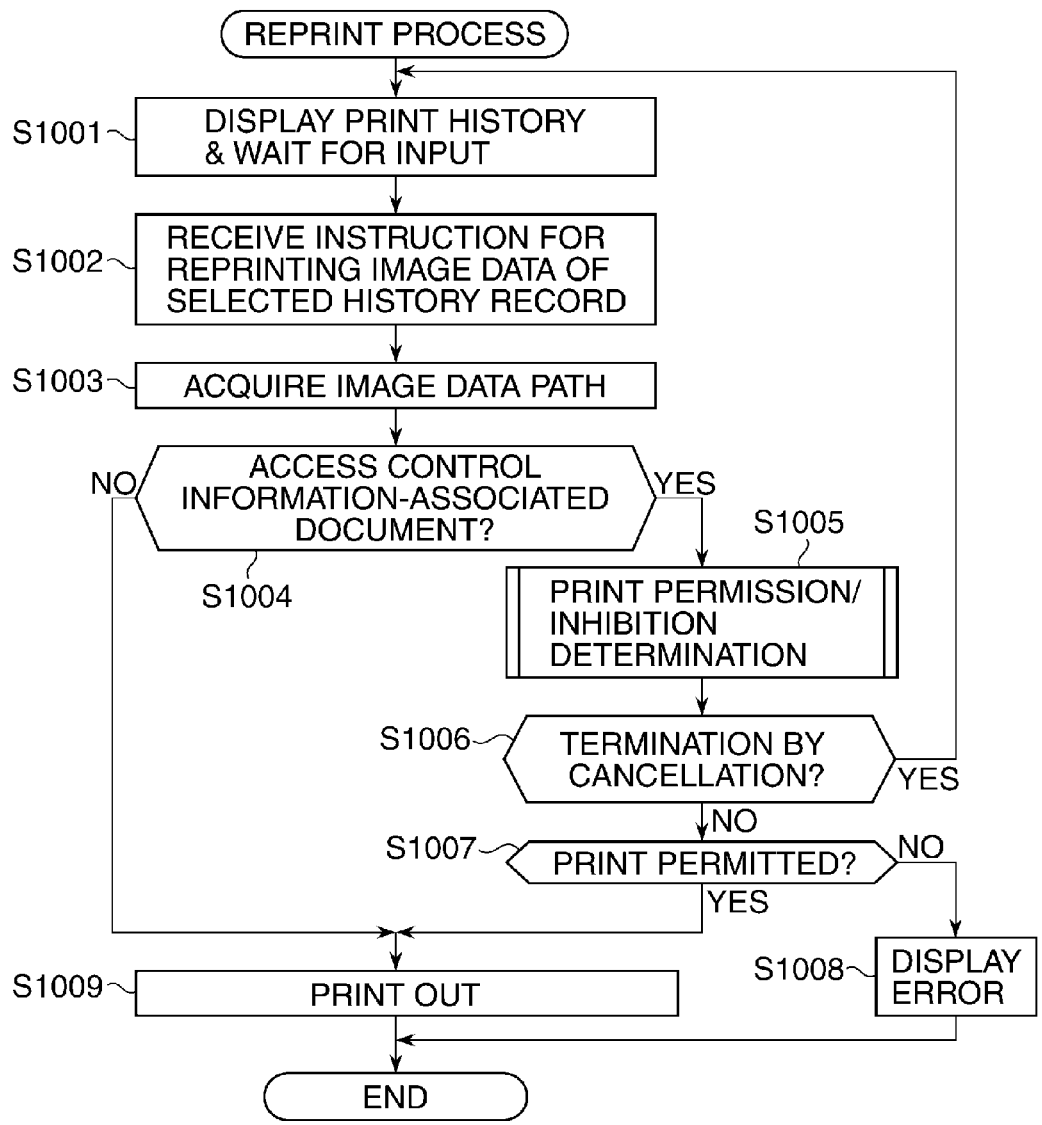
FIG. 10 is a flowchart of a reprint process executed by the CPU of the image forming apparatus according to the second embodiment.

FIG. 10 is a flowchart of the reprint process executed by the CPU 205 of the image forming apparatus according to the second embodiment.

In FIG. 10, when the reprint process is started, the CPU 205 displays print history on the console section 210 and waits for input by the user (step S1001). The print history displayed here is a list of history records of jobs of which the job type 402 is print, out of history records that can be acquired from the history information management 311.

When the CPU 205 receives an instruction given by the user for reprinting image data of a history record selected for reprinting (step S1002), the console section 210 sends the selected history record and a reprint request to the CPU 205.

Further, the CPU 205 acquires an image data path of the received history record from the history information management table 400 (step S1003). The CPU 205 makes an inquiry of the access control 310 about whether the image data identified by the image data path acquired in the step S1003 is an access control information-associated document.

Then, the CPU 205 determines based on a response from the access control 310 whether or not the image data is an access control information-associated document (step S1004). If it is determined in the step S1004 that the image data is not an access control information-associated document (NO to the step S1004), the CPU 205 proceeds to a step S1009.

On the other hand, if it is determined in the step S1004 that the image data is an access control information-associated document (YES to the step S1004), the CPU 205 performs a control information ID-based print permission/inhibition determination process for determining whether the document is permitted to be printed (step S1005).

Then, the CPU 205 determines whether or not the result of the print permission/inhibition determination process indicates termination by cancellation (step S1006). If it is determined in the step S1006 that the result of the print permission/inhibition determination process indicates termination by cancellation (YES to the step S1006), the CPU 205 returns to the step S1001.

On the other hand, if it is determined in the step S1006 that the result of the print permission/inhibition determination process does not indicate termination by cancellation (NO to the step S1006), the CPU 205 determines whether or not the result of the print permission/inhibition determination process indicates that the document is permitted to be printed (step S1007).

If it is determined in the step S1007 that the result of the print permission/inhibition determination process does not indicate that the document is permitted to be printed (NO to the step S1007), the CPU 205 causes an error message to be displayed on the console section 210 (step S1008), followed by terminating the present process.

On the other hand, if it is determined in the step S1007 that the result of the print permission/inhibition determination process indicates that the document is permitted to be printed (YES to the step S1007), The CPU 205 requests the printer section 202 to perform printout via the device interface 219 (step S1009), followed by terminating the present process.

FIG. 11 is a flowchart of the control information ID-based print permission/inhibition determination process executed in the step S1005 in FIG. 10.

Referring to FIG. 11, the CPU 205 displays the authentication information input screen described with reference to FIG. 7 on the console section 210, and waits for input by the user (step S1101).

Next, it is determined whether or not an input from the user has been made by depression of the login button (step S1102). If it is determined in the step S1102 that the input from the user has been made not by depression of the login button but by depression of the cancel button (NO to the step S1102), the present process is terminated by termination by cancellation.

On the other hand, if it is determined in the step S1102 that the input from the user has been made by depression of the login button (YES to the step S1102), the CPU 205 makes a request for authentication by sending authentication information formed by the user name and the password to the access control management server 105 and waits for reception of a result of the authentication therefrom (step S1103).

The CPU 205 receives the result of the authentication (step S1104), and determines whether or not the authentication is successful (step S1105).

If it is determined in the step S1105 that the authentication is not successful (NO to the step S1105), the CPU 205 returns to the step S1101. On the other hand, if it is determined in the step S1105 that the authentication is successful (YES to the step S1105), the CPU 205 performs the following processing: The CPU 205 makes an inquiry of the access control management server 105 about print permission/inhibition set in the access control information identified by the access control information ID (step S1106).

Then, the CPU 205 receives a response to the inquiry as to the print permission/inhibition (step S1107), and then determines whether or not the response to the inquiry indicates that the document is permitted to be printed (step S1108).

If it is determined in the step S1108 that the response to the inquiry indicates that the document is not permitted to be printed (NO to the step S1108), the CPU 205 terminates the present process by error termination.

On the other hand, if it is determined in the step S1108 that the response to the inquiry indicates that document is permitted to be printed, the present process is terminated.

According to the process described above, by storing an access control information ID in the history information management table 400, and when reprinting, it is possible to make an inquiry of the access control management server about print permission/inhibition, whereby it is possible to protect security of the document without degrading the convenience of reprinting.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2012-182540, filed Aug. 21, 2012, which is hereby incorporated by reference herein in its entirety.

What is claimed is:

1. An image forming apparatus capable of communicating with a management server that manages print rights, the image forming apparatus comprising:
    an input unit configured to input data;
    a communication unit configured to, if a print right is associated with the input data, make an inquiry of the management server about print permission of the input data and to receive a response to the inquiry from the management server;
    a printing unit configured to print the input data based on the response received by said communication unit;
    a storage unit configured to store, if said printing unit prints the input data with which a print right is not associated, print history information and raster image data converted from the input data, and to store, if said printing unit prints the input data with which a print right is associated, print history information and the unconverted input data itself; and
    a control unit configured to control said printing unit to re-print the raster image or the input data, based on the print history information stored in said storage unit.

2. The image forming apparatus according to claim 1, further comprising a conversion unit configured to convert the input data to raster image data for use in printing by said printing unit.

3. The image forming apparatus according to claim 1, wherein information on settings for printing data is stored in said storage unit in association with the input data.

4. The image forming apparatus according to claim 1, wherein the image forming apparatus is a printer, and the input unit, the communication unit, the printing unit, the storage unit, and the control unit are all included in the printer.

5. The image forming apparatus according to claim 1, wherein the print history information includes a job type, a user name, a document name, an image data path, and print settings.

6. The image forming apparatus according to claim 1, further comprising a decryption unit configured to decrypt the input data using a decryption key acquired from the management server.

7. The image forming apparatus according to claim 1, further comprising a flag setting unit configured to set a flag according to whether the print right is associated with the input data,
    wherein the storage unit is configured to store the print history information and the unconverted input data itself when the flag is set to indicate that the print right is associated with the input data.

8. The image forming apparatus according to claim 1, wherein if the print right is associated with the input data, the input data is subjected to a first raster image processing before a first printing, and when the input data is to be re-printed after the first printing, the input data is subjected to a second raster image processing before being re-printed.

9. The image forming apparatus according to claim 8, wherein the communication unit is further configured to make another inquiry of the management server about print permission of the input data to be re-printed and to receive a response to the another inquiry from the management server, and the printing unit is further configured to re-print the input data based on the response received by said communication unit.

10. A method of controlling an image forming apparatus capable of communicating with a management server that manages print rights, the method comprising:
  inputting data;
  making an inquiry of the management server about print permission of the input data if a print right is associated with the input data;
  receiving a response to the inquiry from the management server;
  printing by a printing unit, the input data based on the response received from the management server;
  storing print history information and raster image data converted from the input data if the printing unit prints the input data with which a print right is not associated;
  storing print history information and the unconverted input data itself if the printing unit prints the input data with which a print right is associated; and
  controlling the printing unit to re-print the raster image data or the input data, based on the stored print history information.

11. A non-transitory computer-readable storage medium storing a control program for causing a computer to execute a method of controlling an image forming apparatus capable of communicating with a management server that manages print rights,
  wherein the method comprises:
  inputting data;
  making an inquiry of the management server about print permission of the input data if a print right is associated with the input data;
  receiving a response to the inquiry from the management server;
  printing by a printing unit, the input data based on the response received from the management server;
  storing print history information and raster image data converted from the input data if the printing unit prints the input data with which a print right is not associated;
  storing print history information and the unconverted input data itself if the printing unit prints the input data with which a print right is associated; and
  controlling the printing unit to re-print the raster image data or the input data, based on the stored print history information.

12. An image forming apparatus that inquires of a management server about whether or not a print data, on which access control information is set, is permitted to be printed, and controls the printing based on a result of the inquiry, the image forming apparatus capable of receiving an instruction for reprinting through a print history, the image forming apparatus comprising:
  a generating unit configured to generate raster image data from print data on which the access control information is set, or image data on which the access control information is not set;
  a printing unit configured to print an image based on the raster image data generated by the generating unit;
  a storage unit configured to store, in association with the print history, each of the raster image data generated by the generating unit, from the print data on which the access control information is set, and the raster image data generated by the generating unit, from the print data on which the access control information is not set; and
  a reprinting control unit configured to control, in accordance with the instruction for reprinting received through the print history, the printing unit to execute the reprinting, while reading out the raster image data which is associated with the print history from the storage unit,
  wherein, in a case where print data to be reprinted is the print data, associated with the print history, on which the access control information is set, the reprinting control unit inquires again of the management server about whether or not the print data to be reprinted is permitted to be printed, controls the generating unit to generate the raster image data, and controls the printing unit to execute reprinting, in accordance with the instruction for reprinting received through the print history.

13. The image forming apparatus according to claim 12, wherein the reprinting control unit cancels the reprinting to be executed by the instruction for reprinting received through the print history, in a case where it is determined that the reprint of the print data should be prohibited as the result of the inquiry made to the management server again about whether or not the print data is permitted to be reprinted.

14. The image forming apparatus according to claim 12, wherein the access control information is information which is necessary for identifying a print right which is managed by the management server.

15. The image forming apparatus according to claim 12, wherein in a case where the print data to be reprinted is the print data, associated with the print history, on which the access control information is set, the generating unit generates the raster image data only when it is determined that the print data is permitted to be reprinted as the result of the inquiry made to the management server.

16. The image forming apparatus according to claim 12, wherein the print history includes at least a path of the raster image data or a path of the print data on which the access control information is set.

17. A method of controlling an image forming apparatus that inquires of a management server about whether or not a print data, on which access control information is set, is permitted to be printed, and controls the printing based on a result of the inquiry, the image forming apparatus capable of receiving an instruction for reprinting through a print history, the method comprising:
  generating raster image data from print data on which the access control information is set, or image data on which the access control information is not set;
  printing an image based on the generated raster image data;
  storing, in association with the print history, each of the raster image data generated from the print data on which the access control information is set and the raster image data generated from the print data on which the access control information is not set;
  controlling, in accordance with the instruction for reprinting received through the print history, to execute the reprinting, while reading out the stored raster image data which is associated with the print history;
  wherein, in a case where print data to be reprinted is the print data, associated with the print history, on which the access control information is set, the management server is inquired about whether or not the print data to be reprinted is permitted to be printed, the raster image data is generated, and the reprinting executed, in accordance with the instruction for reprinting received through the print history.

18. A non-transitory computer-readable storage medium storing a control program for causing a computer to execute a method of controlling an image forming apparatus that inquires of a management server about whether or not a print data, on which access control information is set, is permitted to be printed, and controls the printing based on a result of the inquiry, the image forming apparatus capable of receiving an instruction for reprinting through a print history, wherein the method comprises:
generating raster image data from print data on which the access control information is set, or image data on which the access control information is not set;
printing an image based on the generated raster image data;
storing, in association with the print history, each of the raster image data generated from the print data on which the access control information is set and the raster image data generated from the print data on which the access control information is not set;
controlling, in accordance with the instruction for reprinting received through the print history, to execute the reprinting, while reading out the stored raster image data which is associated with the print history;
wherein, in a case where print data to be reprinted is the print data, associated with the print history, on which the access control information is set, the management server is inquired about whether or not the print data to be reprinted is permitted to be printed, the raster image data is generated, and the reprinting executed, in accordance with the instruction for reprinting received through the print history.

\* \* \* \* \*